US008295125B2

(12) United States Patent
Chiappetta et al.

(10) Patent No.: US 8,295,125 B2
(45) Date of Patent: Oct. 23, 2012

(54) SONAR SCANNER

(75) Inventors: Mark Chiappetta, Chelmsford, MA (US); James Allard, Newton, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 13/350,447

(22) Filed: Jan. 13, 2012

(65) Prior Publication Data

US 2012/0116587 A1    May 10, 2012

Related U.S. Application Data

(63) Continuation of application No. 12/750,506, filed on Mar. 30, 2010, now Pat. No. 8,107,318, which is a continuation of application No. 12/115,229, filed on May 5, 2008, now Pat. No. 7,688,676, which is a continuation of application No. 11/085,832, filed on Mar. 21, 2005, now Pat. No. 7,369,460, which is a continuation-in-part of application No. 09/921,181, filed on Aug. 2, 2001, now Pat. No. 6,870,792.

(60) Provisional application No. 60/222,542, filed on Aug. 3, 2000.

(51) Int. Cl.
*G01S 15/00* (2006.01)

(52) U.S. Cl. ........................................................ 367/98

(58) Field of Classification Search .................... 367/98, 367/96; 901/1, 46; 356/4.01, 5.01
See application file for complete search history.

(56) References Cited

U.S. PATENT DOCUMENTS

| 3,929,006 A | 12/1975 | Boggs et al. |
| 4,349,897 A | 9/1982 | Boehme et al. |
| 4,380,807 A | 4/1983 | Reynard |
| 4,414,643 A | 11/1983 | Meyer |
| RE31,509 E | 1/1984 | Neidell |
| 4,470,048 A | 9/1984 | Short |
| 4,586,043 A | 4/1986 | Wolf |
| 4,596,144 A | 6/1986 | Panton et al. |
| 4,620,285 A | 10/1986 | Perdue |
| 4,679,152 A | 7/1987 | Perdue |
| 4,785,664 A | 11/1988 | Reebs |
| 4,831,565 A | 5/1989 | Woodward |
| 4,890,266 A | 12/1989 | Woodward |
| 4,992,998 A | 2/1991 | Woodward |
| 5,150,334 A | 9/1992 | Crosby |
| 5,173,881 A | 12/1992 | Sindle |
| 5,250,801 A | 10/1993 | Grozinger et al. |

(Continued)

FOREIGN PATENT DOCUMENTS

GB    2230608    10/1990

(Continued)

OTHER PUBLICATIONS

International Search Report for App. Ser. No. PCT/US01/24395, mailed Jun. 14, 2002, 5 pages.

(Continued)

*Primary Examiner* — Daniel Pihulic
(74) *Attorney, Agent, or Firm* — Fish & Richardson P.C.

(57) ABSTRACT

Detecting an object using sound waves includes outputting a sound wave from a transducer, receiving an echo after outputting the sound wave, obtaining a threshold value based on the echo and plural other echoes that are within a predetermined range of the echo, and determining if the echo is a result of the sound wave based on the threshold value.

25 Claims, 7 Drawing Sheets

U.S. PATENT DOCUMENTS

| | | | |
|---|---|---|---|
| 5,277,064 | A | 1/1994 | Knigga et al. |
| 5,438,247 | A | 8/1995 | Kim et al. |
| 5,488,377 | A | 1/1996 | Reynolds et al. |
| 5,526,321 | A | 6/1996 | Kim |
| 5,717,169 | A | 2/1998 | Liang et al. |
| 6,108,269 | A | 8/2000 | Kabel |
| 6,335,905 | B1 | 1/2002 | Kabel |
| 6,885,611 | B2 | 4/2005 | Preston |
| 7,369,460 | B2 | 5/2008 | Chiappetta et al. |
| 7,688,676 | B2 | 3/2010 | Chiappetta et al. |
| 2008/0205194 | A1 | 8/2008 | Chiappetta et al. |
| 2012/0116587 | A1* | 5/2012 | Chiappetta et al. ........... 700/258 |

FOREIGN PATENT DOCUMENTS

| | | |
|---|---|---|
| JP | 356069569 | 6/1981 |
| WO | WO02/012917 | 2/2002 |

OTHER PUBLICATIONS

Blazevic et al., "Mobile robot using ultrasonic sensors: study of a degraded mode" *Robotica* 9:365-370, 1991.

Bozma et al., "Building a Sonar Map in a Specular Environment Using a Single Mobile Sensor" *IEEE Transactions on Pattern Analysis and Machine Intelligence* 13:(12):1260-1269, 1991.

Bozma et al., "Characterizing the Environment Using Echo Energy, Duration, and Range: the Endura Method" *Proceedings of the 1992 IEEE/RSJ International Conference on Intelligent Robots and Systems*, Raleigh, NC, 813-820, 1992.

Drotning et al., "A VMEbus Ultrasonic Sensor Controller for Mapping and Servo Control in Robotic Systems" *Intelligent Systems Department II*, Sandia National Laboratories, Albuquerque, NM, 37-44.

Elfes "A Sonar-Based Mapping and Navigational System" *IEEE*, 1151-1156, 1986.

Everett "A Multi-Element Ultra Sonic Ranging Array" *Naval Sea Systems Command, Washington, DC*, pp. i-58, 1985.

Higuchi et al., "B-Mode Imaging Using Si Ultrasonic Image Sensor" *Microelectronics Research Laboratories, NEC Corporation*, Shimokuzawa, Sagamihara, Kanagawa 229, Japan, R&D Laboratory, NEC Home Electronics Ltd., Takatsu-ku, Kawasaki, Kanagawa 213, Japan, C&C Systems Research Laboratories, NEC Corporation, Miyamae-ku, Kawasaki, Kanagawa 213, Japan, 1-6, Figs. 1-8.

Horiguchi "A Digital Phase Delay Compensation Beam-Forming Scheme for Ultrasonic Imaging" *Journal of Applied Physics* 27(27-1):215-217, 1988.

Hong et al., "Analysis of Ultrasonic Differentiation of Three Dimensional Corners, Edges and Planes", *Proceedings of the 1992 IEEE, International Conference on Robotics and Automation*, Nice, France, 580-584, 1992.

Kay "Airborne Ultrasonic Imaging of a Robot Workspace" University of Canterbury, New Zealand, 287-296.

Kuc "Three-dimensional tracking using qualitative bionic sonar" *Robotics and Autonomous Systems Elsevier Science* 11:213-219, 1993.

Kuc et al., "Docking Mobile Robots Using a Bat-like Sonar" *Proceedings of the 1992 IEEE/RSJ International Conference on Intelligent Robots and Systems*, Raleigh, NC, 1439-1444, 1992.

Kuc et al., "Navigating Vehicles Through an Unstructured Environment with Sonar", IEEE, 1422-1426, 1989.

Kuc et al., "A Physically Based Navigation Strategy for Sonar-Guided Vehicles", The International Journal of Robotics Research 10(2):75-87, 1991.

Kuroda et al., "Ultrasonic Imaging System for Robots Using an Electronic Scanning Method" Robot Sensors, 271-285.

Lang et al., "Characterizing and modeling a sonar ring" *Mobile Robots IV* 1195:291-304, 1989.

Langer et al., "Sonar based Outdoor Vehicle Navigation and Collision Avoidance" *Proceedings of the 1992 IEEE/RSJ International Conference on Intelligent Robots and Systems*, Raleigh, NC, 1445-1450, 1992.

LeMay et al., "Error Minimization and Redundancy Management for a Three Dimensional Ultrasonic Ranging System" *Proceedings of the 1992 IEEE/RSJ International Conference on Intelligent Robots and Systems*, Raleigh, NC, 837-844, 1992.

Lim et al., "Physically Based Sensor Modeling for a Sonar Map in a Specular Environment" *Proceedings of the 1992 IEEE International Conference on Robotics and Automation*, Nice, France, 1714-1719, 1992.

Mataric "Qualitative Sonar Based Environment Learning for Mobile Robots" *Mobile Robots IV* 1195:305-314, 1989.

Matthies et al., "Integration of Sonar and Stereo Range Data Using a Grid-Based Representation" *IEEE*, 232-238, 1988.

McKerrow et al., "An Introduction to the Physics of Echolocation" *Third Conference on Robotics, Australian Robot Association*, 1-19, 1990.

McKerrow "Simulation of Sonar Echolocation" *Dept. of Computing Science, University of Wollongong, Australia*, 10 pages.

Morcuo et al., "Mobile Robot Multitarget Tracking in Dynamic Environments" *Proceedings of the 1992 IEEE/RSJ International Conference on Intelligent Robots and Systems*, Raleigh, NC, 1464-1469, 1992.

Nagashima et al., "Ultrasonic sensing for a mobile robot to recognize an environment—Measuring the normal direction of walls—" *Proceedings of the 1992 IEEE/RSJ International Conference on Intelligent Robots and Systems*, Raleigh, NC, 805-812, 1992.

Pomeroy et al., "Ultrasonic Distance Measuring and Imaging Systems for Industrial Robots", *Robot Sensors* 2:261-270, 1986.

Pomeroy et al., "Evaluation of ultrasonic inspection and imaging systems for robotics using TLM modelling" *Robotica* 9:283-290, 1991.

Rafiq et al., "The performance of capacitive ultrasonic transducers using v-grooved backplates" *Meas. Sci. Technol.* 2:168-174, 1991.

Sasaki et al., "Classification of Objects' Surface by Acoustic Transfer Function" *Proceedings of the 1992 IEEE/RSJ International Conference on Intelligent Robots and Systems*, Raleigh, NC, 821-828, 1992.

Sun et al., "Computer simulation of sensor-based robot collision avoidance in an unknown environment" *Proceedings of the 1992 IEEE/RSJ International Conference on Intelligent Robots and System, Raleigh, NC*, 291-302, 1986.

Takanashi et al., "A Robotic Ultrasonic Imaging System Using a Si Phased-array Receiver" *Industrial Symposium Industrial Robots*, Kawaski, Japan, 6 pages, 1989.

Walter "The Sonar Ring: Obstacle Detection for a Mobile Robot" *IEEE* 1574-1579, 1987.

van Turennout et al., "Following a Wall with a Mobile Robot using Ultrasonic Sensors" *Proceedings of the 1992 IEEE/RSJ International Conference on Intelligent Robots and Systems*, Raleigh, NC, 1451-1456, 1992.

Yang et al., "Design of Ultrasonic Linear Array System for Multi-Object Identification" *Proceedings of the 1992 IEEE/RSJ International Conference on Intelligent Robots and Systems*, Raleigh, NC, 1625-1632, 1992.

"4. The Tympanic-nerve Response in Noctuid Moths" *Tympanic Response in Moths*, 34-99.

Borenstein and Koren, "Noise Rejection for Ultrasonic Sensors in Mobile Robot Applications", *Proceeding of the 1992 IEEE International Conference on Robotics and Automation*, Nice, France, 1727-1732, 1992.

Kuc and Siegel, "Efficient Representation of Reflecting Structures for a Sonar Naviagtion Model", *IEEE*, pp. 1916-1923, 1987.

Kuc and Viard, "Guiding Vehicles with Sonar: The Edge Problem", IEEE 1988 Ultrasonics Symposium, Chicago, Illinois, pp. 1-4.

Parnis and Drazan, "Recognition of unreliable ultrasonic range data in a robotic environment", 7 pages, 1988.

Sabatini, Am, "Active Hearing for External Imaging Based on an Ultrasonic Transducer Array", *Proceedings of the 1992 IEEE/RSJ International Conference on Intelligent Robots and Systems, Raleigh, NC*, Jul. 7-10, 1992, pp. 829-836.

\* cited by examiner

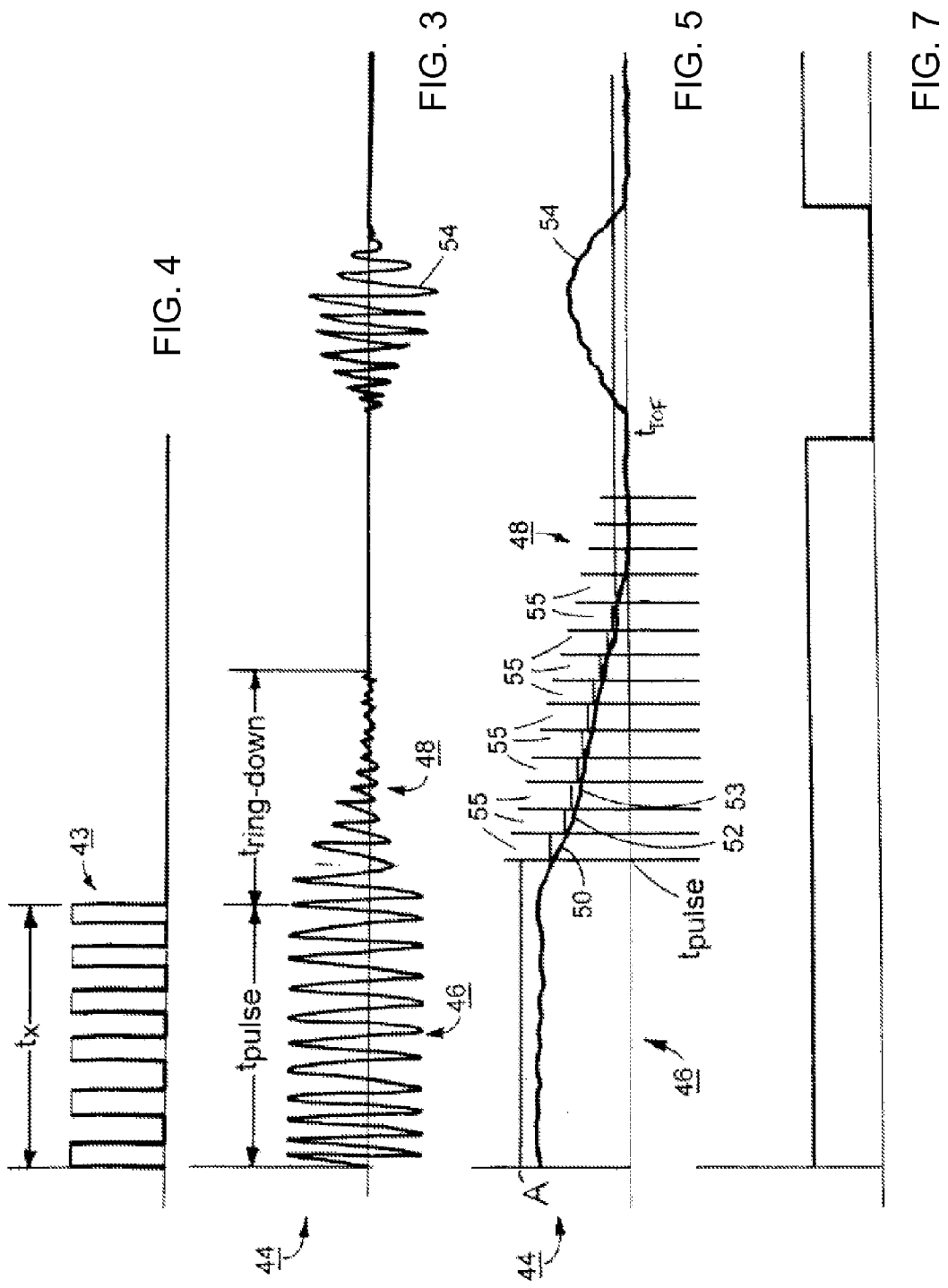

SONAR SCANNER

CROSS-REFERENCE TO RELATED APPLICATIONS

This application is a continuation (and claims the benefit of priority under 35 USC 120) of U.S. application Ser. No. 12/750,506, filed Mar. 30, 2010, (issued on Jan. 31, 2012 as U.S. Pat No. 8,107,318) which is a continuation of U.S. application Ser. No. 12/115,229, filed May 5, 2008 (issued on Mar. 30, 2010 as U.S. Pat. No. 7,688,676 ),which is a continuation of, and claims priority under 35 U.S.C. §120 from, U.S. patent application Ser. No. 11/085,832, filed on Mar. 21, 2005 (issued on May 6, 2008 as U.S. Pat. No. 7,369,460), which is a continuation-in-part of, and claims priority to, U.S. patent application Ser. No. 09/921,181, filed on Aug. 2, 2001 (issued on Mar. 22, 2005 as U.S. Pat. No. 6,870,792), which claims priority under 35 U.S.C. §119(e) to U.S. Provisional Application No. 60/222,542, filed on Aug. 3, 2000. The disclosures of these prior applications are considered part of the disclosure of this application and are hereby incorporated by reference in their entireties.

U.S. patent application Ser. No. 09/826,209, filed Apr. 4, 2001, issued on Dec. 16, 2003 as U.S. Pat. No. 6,662,889),and U.S. Provisional Application No. 60/194,922, filed Apr. 4, 2000 are also incorporated by reference into this application as if set forth herein in full, although no priority claim is made to these two applications.

TECHNICAL FIELD

This invention relates generally to using sound waves to detect objects and, more particularly, to a sonar scanner that uses sound waves to detect objects in the environment of a mobile robot.

BACKGROUND

A mobile robot senses objects in its environment in order to determine its own location, map the environment for later localization and navigation, and, in non-static environments, to avoid obstacles.

A number of obstacle detection systems are currently in use, including complex computer vision systems, scanning laser range finders, and arrays of discrete ultrasonic transducers. Computer vision and scanning laser range finders tend to be prohibitively expensive in many applications. Mobile robots therefore often use ultrasonic sonar devices for obstacle avoidance.

The word "sonar" is an acronym for "SOund Navigation and Ranging". A sonar scanner typically includes a transmitter, a transducer, a receiver, and a signal processor. An electrical impulse (or "pulse"), usually a waveform, from the transmitter is converted into a sound wave by the transducer and propagated in a given direction. When the sound wave strikes an object, it rebounds, producing an "echo". This echo strikes the transducer. The transducer converts the echo into an electrical signal, which is amplified by the receiver and fed into a detector and stored for processing.

Since the speed of sound in any given environment is known, the time lapse between the transmitted signal and the received echo can be measured and the distance to an object that produced the echo determined. This time lapse is called the "time of flight".

One configuration for producing the transmitted signal and receiving the echo is a sonar ring. A sonar ring includes a number of transducers positioned around a robot to allow simultaneous sensing in more than one direction. A sonar ring may include any number of transducers and may or may not provide detection in a 360° field, depending on the number, placement and echo field of the transducers. For example, where each transducer's echo field covers 15° of radial space, a robot would need 24 evenly-spaced and directed transducers in order to have full 360° coverage.

This high number of sonar components has a number of drawbacks, including cost. Not only do sonar ring systems eliminate many of the cost benefits of using a sonar-based system, sonar rings often produce data of questionable quality due to the increased amount of acoustic energy being transmitted into the environment from multiple transducers. This acoustic energy may reflect off of multiple objects, resulting in multipath reflections. Multipath reflections are echoes that have not traveled in a direct path from the object to the receiver. For example, an echo that reflects off of one or more walls will have a longer time of flight and appear as an object farther away from the sonar scanner than it is in fact.

Thus, the transducer is subject to receiving sound waves from several sources, not just the intended echo. Distinguishing between the echo, spurious signals and/or extraneous noise is one challenge faced in designing a sonar scanner for a mobile robot or other application. In addition to multipath reflections, examples of extraneous environmental noise include acoustic steady state and periodic noise, acoustic impulse noise, electrical impulse, and ultrasonic noise from intentional sources, such as other robots, ultrasonic door openers, etc.

In a sonar scanner, the transducer emits a signal (or pulse) having a finite duration, $t_{emit}$. Conventionally, during the process of emitting the pulse, the receiver is disabled by a system controller as it waits for the transducer to cease operation in order to begin listening for the echo. The time that the receiver is disabled is known as the "blanking time" $t_{blank}$. The receiver is disabled in order to be sure that it does not become saturated as it detects the transducer emitting the sound wave. A byproduct of this delay, i.e., the receiver blanking time, is that it prevents the sonar scanner from detecting real objects within a certain distance.

Typically, the duration of the pulse signal is reduced in order to reduce the minimum measurable distance of the sonar scanner. Due to its mechanical nature, however, the transducer continues to vibrate even after the transmitter signal has ceased. This continued vibration is typically referred to as the "ring-down". This additional latency in the system extends $t_{emit}$, so that the total time of the signal can be characterized as the duration of the pulse ($t_{pulse}$) plus the duration of the ring-down ($t_{ring-down}$). Thus, the ring-down makes it difficult for a sonar scanner to detect objects within a certain distance. In the prior art, the minimum detection distance is about one foot.

In addition, mobile robot sonar scanners also face challenges from extraneous noise in the environment. For example, if the environment contains a continuous source of acoustic or electrical noise, such as a vacuum cleaner or air conditioning unit, the sonar scanner may be susceptible to this noise. The robot itself may be a source of continuous noise, which could also affect the ability of the sonar scanner to detect echoes.

SUMMARY

This patent application provides methods and apparatus, including computer program products and machine-readable media, for using sound waves to detect objects. Aspects of the invention are set forth below.

In general, in one aspect, the invention is directed to a method that includes transmitting a sound wave comprised of a first portion and a second portion, where the first portion comprises a pulse signal and the second portion comprises a ring-down signal, obtaining a characteristic of the second portion, storing the characteristic, using the characteristic to detect an echo of another sound wave, and repeating transmitting, obtaining, storing and using periodically for different sound waves and corresponding first and second portions.

The foregoing aspect may also include one or more of the following features. The ring-down signal may comprise a signal that decays in amplitude over time. The ring-down signal may be a function of a transducer used to transmit the pulse signal. The characteristic may be an amplitude of the ring-down signal.

The method may include transmitting the other sound wave comprised of a first portion and a second portion, receiving an echo of the other sound wave, and analyzing the echo of the other sound wave based on the characteristic. Analyzing may include distinguishing the second portion of the other sound wave from the echo of the other sound wave. Distinguishing may include detecting an amplitude in the echo based on the characteristic. Detecting the amplitude in the echo may include assigning a threshold based on the characteristic, and comparing the amplitude in the echo to the threshold. The amplitude in the echo may be detected if the amplitude in the echo exceeds the threshold.

In general, in another aspect, the invention is directed to a pulse-echo sonar scanner for a mobile robot. The pulse-echo scanner includes a transmitter which generates a pulse signal, an acoustic transducer which transmits and receives acoustic signals, a receiver, and means for determining performance characteristics of the transducer periodically during operation of the pulse-echo sonar scanner for a given pulse, where the performance characteristics of the transducer comprise transducer ring-down. The pulse-echo scanner also includes means for storing the performance characteristics, and means for determining threshold levels for an echo signal based on the stored performance characteristics.

The foregoing aspect may also include one or more of the following features. The acoustic transducer may be capable of rotation through 360°. A controller may control an angular position of the acoustic transducer. There may be a reflective surface on the acoustic transducer that is controlled by the controller.

In general, in another aspect, the invention is directed to a method of adjusting threshold levels on a mobile robot scanner. The method includes measuring ring-down characteristics of the mobile robot scanner periodically during operation of the mobile robot scanner, creating a dynamic threshold level based on the ring-down characteristics, and applying the dynamic threshold levels to received signals.

In general, in another aspect, the invention is directed to a method of receiving plural reflections of corresponding emissions, determining a threshold value based on the plural reflections, comparing a target reflection to the threshold value, the target reflection comprising one of the plural reflections, and determining if the target reflection is a valid reflection based on comparison to the threshold value.

The foregoing aspect may also include one or more of the following features. Determining may include averaging magnitudes of the plural reflections, and/or applying a scaling factor to an average of the magnitudes of the plural reflections. The plural reflections may include a first reflection, followed by a second reflection, followed by a third reflection, and the target reflection may include the second reflection. The first reflection, the second reflection, and the third reflection may be adjacent in time. The emissions may include sound waves and the plural reflections may include echoes of the sound waves. The emissions may be laser beams, and the reflections may be reflections of the laser beams.

In general, in another aspect, the invention is directed to a method of detecting an object using sound waves. The method includes outputting a sound wave from a transducer, receiving an echo after outputting the sound wave, obtaining a threshold value based on the echo and plural other echoes that are within a predetermined range of the echo, and determining if the echo is a result of the sound wave based on the threshold value.

The foregoing aspect may also include one or more of the following features. Obtaining the threshold value may include obtaining an average that is based on the echo and the plural other echoes, and/or modifying the average using a scaling factor.

Other features and advantages of the invention will become apparent from the following description, including the claims and drawings.

BRIEF DESCRIPTION OF THE DRAWINGS

FIG. 3 is a graph showing a sound wave produced by the sonar scanner.

FIG. 4 is a graph showing a waveform used to excite a transducer in the sonar scanner to produce the sound wave.

FIG. 5 is a graph showing amplitude thresholds for the sound wave of FIG. 3.

FIG. 7 is a graph of a pulse that is transmitted in response to detection of an echo.

Like reference numerals in different figures indicate like elements.

DESCRIPTION

Figure 1:
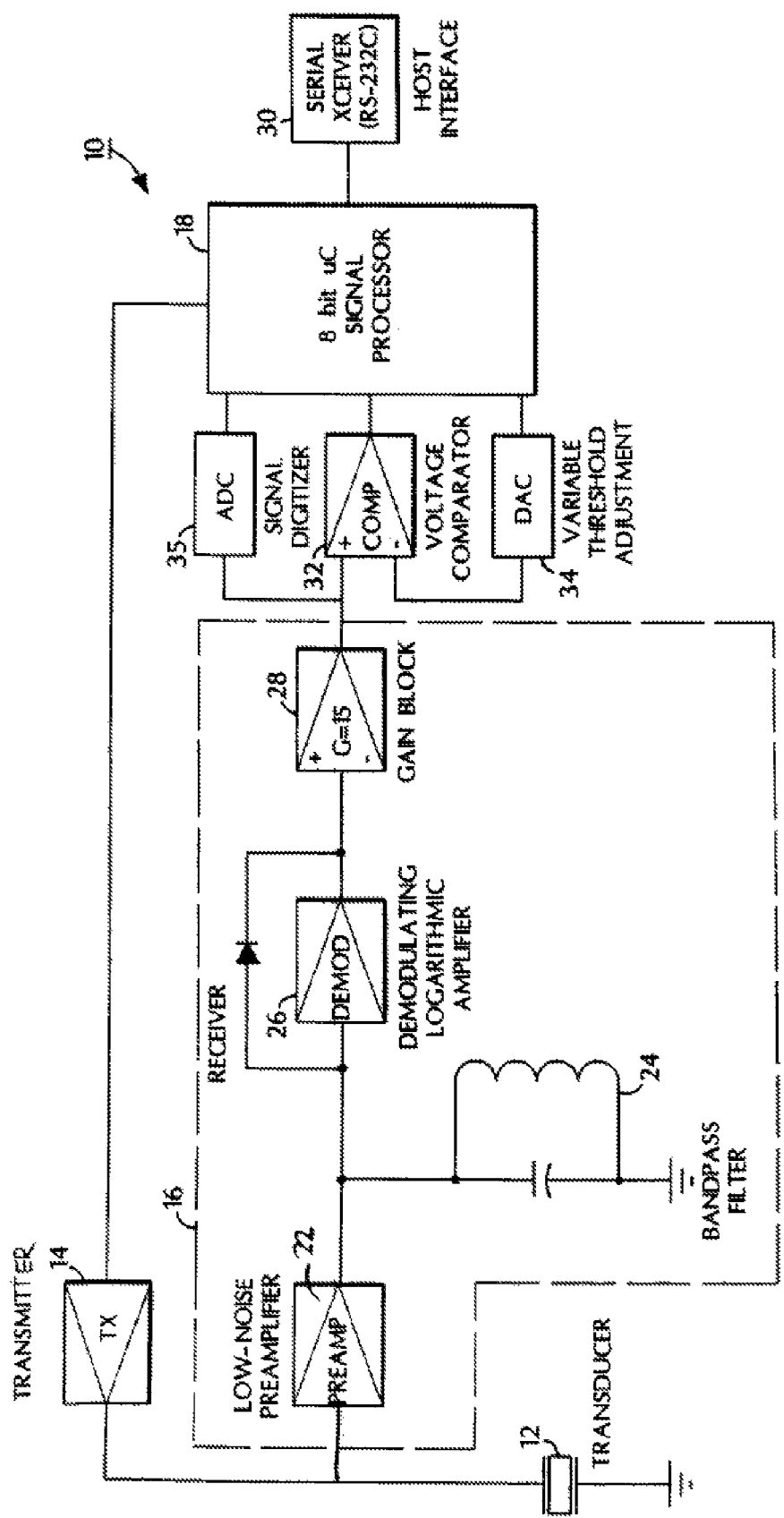
FIG. 1 is a block diagram of circuit elements that make up a sonar scanner.

FIG. 1 shows a block diagram of a sonar scanner 10 for a mobile robot. Sonar scanner 10 includes a transducer 12, a transmitter 14 for generating a sound wave, and a receiver 16 for receiving an echo of that sound wave. Transmitter 14 produces electrical signals based on the output of signal processor 18, which cause transducer 12 to vibrate and thereby output sound waves.

Transducer 12 is also responsive to received sonar echoes produced from the transmitted sound waves. The received echoes are transmitted from transducer 12 to receiver 16, where they are demodulated, digitized, and transmitted to signal processor 18 for processing.

To this end, receiver 16 includes a low-noise pre-amplifier 22 to amplify the received echo signals, a bandpass filter 24 to remove signals outside of the echo frequency range, and a demodulating logarithmic amplifier 26 and gain block 28 to amplify and acquire the envelope of the filtered signals. Analog-to-digital converter (ADC) 35 digitizes these signals and provides them to signal processor 18. Comparator 32 receives the analog signals and compares them to predetermined thresholds, as described below. These thresholds may be stored, e.g., in a memory of signal processor 18 and converted to analog form via digital-to-analog converter (DAC) 34 prior to comparison. Results of the comparison are provided to signal processor 18. Alternatively, the function of comparator 32 may be implemented in software running on signal processor 18.

A host interface 30 is also connected to signal processor 18. Host interface 30 allows a host, e.g., a mobile robot, to receive commands from signal processor 18 that are based on transmitted and received sound waves. For example, an object may be detected, as described below, using sonar scanner 10. Signal processor 18 may then notify the host processor of the object's existence.

Figure 2:
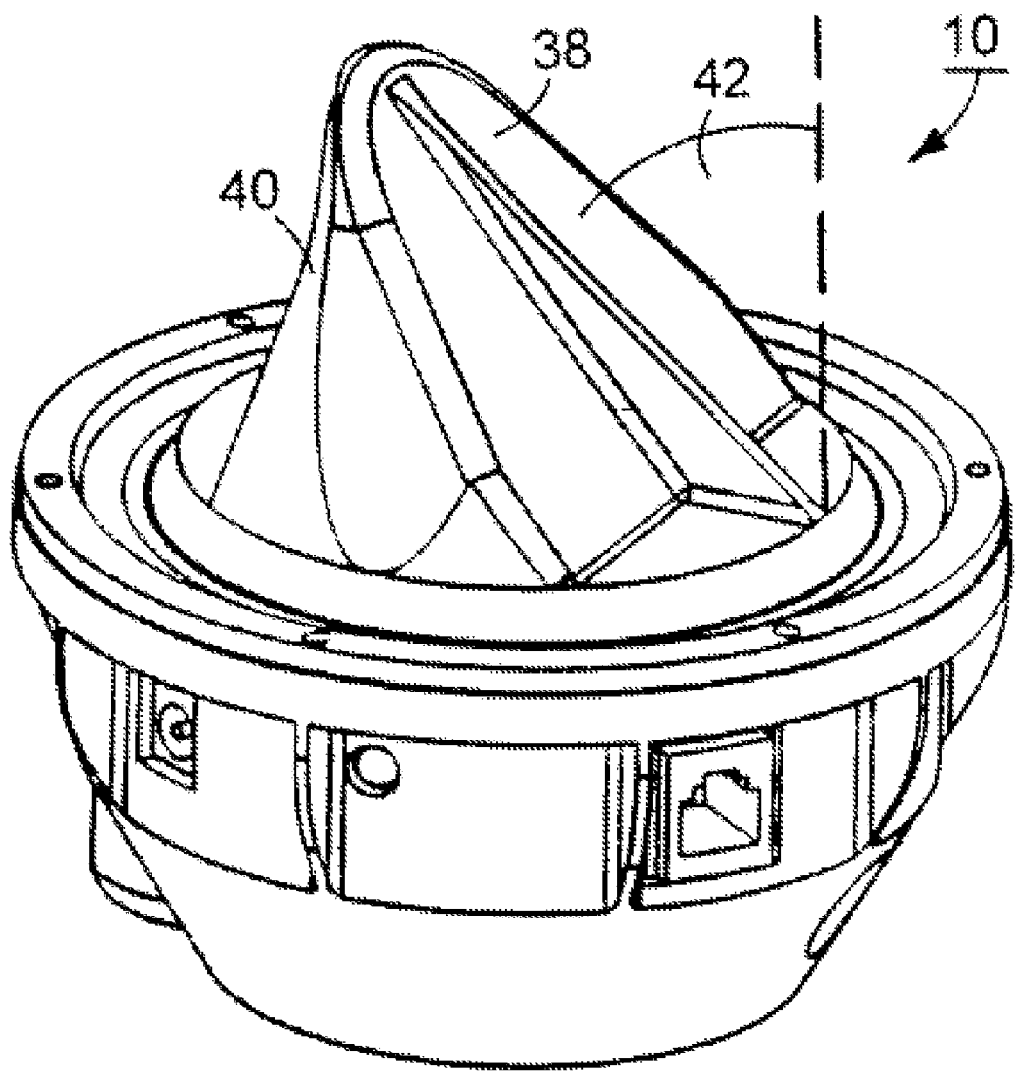
FIG. 2 is a perspective view of the sonar scanner.

FIG. 2 shows a perspective view of sonar scanner 10. Sonar scanner 10 includes an acoustic reflector 38 that is mounted on a servo motor (not shown). The servo motor rotates acoustic reflector 38 so that acoustic reflector 38 transmits the sound waves generated by transducer 12 at any angle of a 360° radial direction. The rotation is fluid, but slow enough so that the echo of a sound wave can be received by the sonar scanner. In other embodiments, the sonar scanner's rotation can be in discrete angular steps controlled by a stepper motor. The rate of rotation of the servo motor is determined by the time of flight of the sound wave. That is, the longer the time of flight, the slower the servo motor rotates and vice versa. A controller, such as signal processor 18, may be used to determine the rate of rotation.

Reflector 38 may be an angled structure for transmitting sound waves in a desired echo field. An echo field, in this context, is an area for receiving echoes from an object. Reflector 38 is contained within a cone-shaped housing 40 that allows transducer 12 to "pick-up" an echo in the echo field. The size and shape of the echo field are based on angle 42 and the shapes of the reflector and transducer.

In this embodiment, a plane-shaped acoustic mirror is used as the reflector. It is noted, however, that the reflector may be contoured to passively form the outgoing acoustic energy into a predetermined shape. This would also shape the transducer's receive sensitivity pattern. In this embodiment, the reflector is shaped so that it detects objects at a ±5° angle relative to a center-line of the reflector. By changing the shape of the reflector, and thus the shape of the outgoing energy, e.g., from a circular shape to an elliptical shape, it is possible for the reflector to pick-up objects at different angles.

This embodiment of sonar scanner 10 uses a single transducer (versus the "sonar ring" of the prior art, which used as many as 24 transducers, plus electronics). Using a single transducer, instead of multiple transducers, reduces the cost of sonar scanner 10 relative to its conventional counterparts. A single transducer also lowers the amount of acoustic energy in the environment. Also, a single transducer results in fewer sound waves reflecting off surfaces in a given area. Even in the preferred embodiment, the sonar scanner is subject to potential multipath errors. For example, the sonar scanner emits a sound wave facing east, the sound wave reflects off a wall, and the sonar scanner (still rotating), picks up the echo facing north. Such multipath errors can be reduced by adjusting the rotational velocity of the single transducer periodically to separate real objects from "ghost" objects. A single transducer also limits the echo field, thereby reducing receipt of false or spurious signals by the transducer.

The entire sonar scanner 10 may be mounted on a mobile platform having a drive mechanism that propels a robot. Any type of drive mechanism and robot may be used. Examples of a mobile platform that may be used are shown in U.S. patent application Ser. No. 09/826,209 and U.S. Provisional Application No. 60/194,922 incorporated by reference above.

FIG. 3 shows the profile of a sound wave 44 produced by transducer 12. The transducer is excited with a square wave 43 (FIG. 4) and outputs the sinusoidal waveform of FIG. 3. As shown, the waveform of sound wave 44 includes a pulse signal/portion 46 and a "ring-down" signal/portion 48. Ring-down signal 48 is produced by transducer 12 as transducer 12 settles. That is, while transducer 12 is excited by transmitter 14, transducer 12 produces pulse signal 46. When the electrical stimulus provided by transmitter 14 is removed from transducer 12, due to its mechanical nature, transducer 12 does not immediately cease operation. Rather, the operation of transducer 12 ceases gradually, resulting in the decaying waveform of ring-down signal 48. The length and period of ring-down signal 48 depends on the mechanical characteristics of transducer 12.

FIG. 5 shows the demodulated version of the sound wave 44. As shown, pulse signal 46 has an amplitude "A" and a time duration "$t_{pulse}$". While pulse signal 46 can have a variable waveform shape and frequency, sonar scanners for mobile robots typically use a sinusoidal waveform operating at an ultrasonic frequency of between 40 kHz (kilohertz) and 215 kHz, e.g., 92 KHz. It is noted, however, that sonar scanner 10 is not limited to use with these frequencies. Higher frequencies provide better resolution in general, but higher-frequency signals attenuate quicker, which reduces detection range.

After $t_{pulse}$, transducer 12 begins its ring-down, during which sound waves are produced having decreasing amplitudes 50, 52, 53, etc. These amplitudes are set as amplitude thresholds for the ring-down signal. Ring-down signal 48 has a duration of $t_{ringdown}$. Thus, the total duration of the sound wave produced by transducer 12 is $t_{blank}$, which equates to $t_{pulse}$ plus $t_{ringdown}$.

If there is an object in the transducer's echo field, sound wave 44 reflects off of that object and produces an echo 54 (FIG. 3). The demodulated echo 54 is shown in FIG. 5. The echo returns to the transducer at time $t_{TOF}$, where "TOF" stands for "time of flight". The distance (D) from transducer 12 to the object then can be calculated as follows $$D = v \cdot t_{TOF}/2,$$

where "v" in the above equation is the velocity of sound in the environment that transducer 12 is operating.

As noted above, the ring-down time can affect the distance that can be sensed using transducer 12 because it can be mistaken for an echo. A long ring-down time can make it difficult to detect objects that are in close proximity to the transducer. That is, the ring-down signal can interfere with transducer receipt of the echo, making it difficult for the transducer to distinguish between the echo and the ring-down signal.

Dynamic Threshold Control

In order to reduce the foregoing problems associated with detecting the echo in the presence of the ring-down signal, sonar scanner 10 uses dynamic threshold control. Dynamic threshold control is a process that uses amplitude detection with time varying thresholds to distinguish the echo from the ring-down signal within the ring-down period. Distinguishing the echo from the ring-down signal in this manner makes it possible for the sonar scanner to detect objects that are relatively close in proximity to the transducer.

Figure 6:
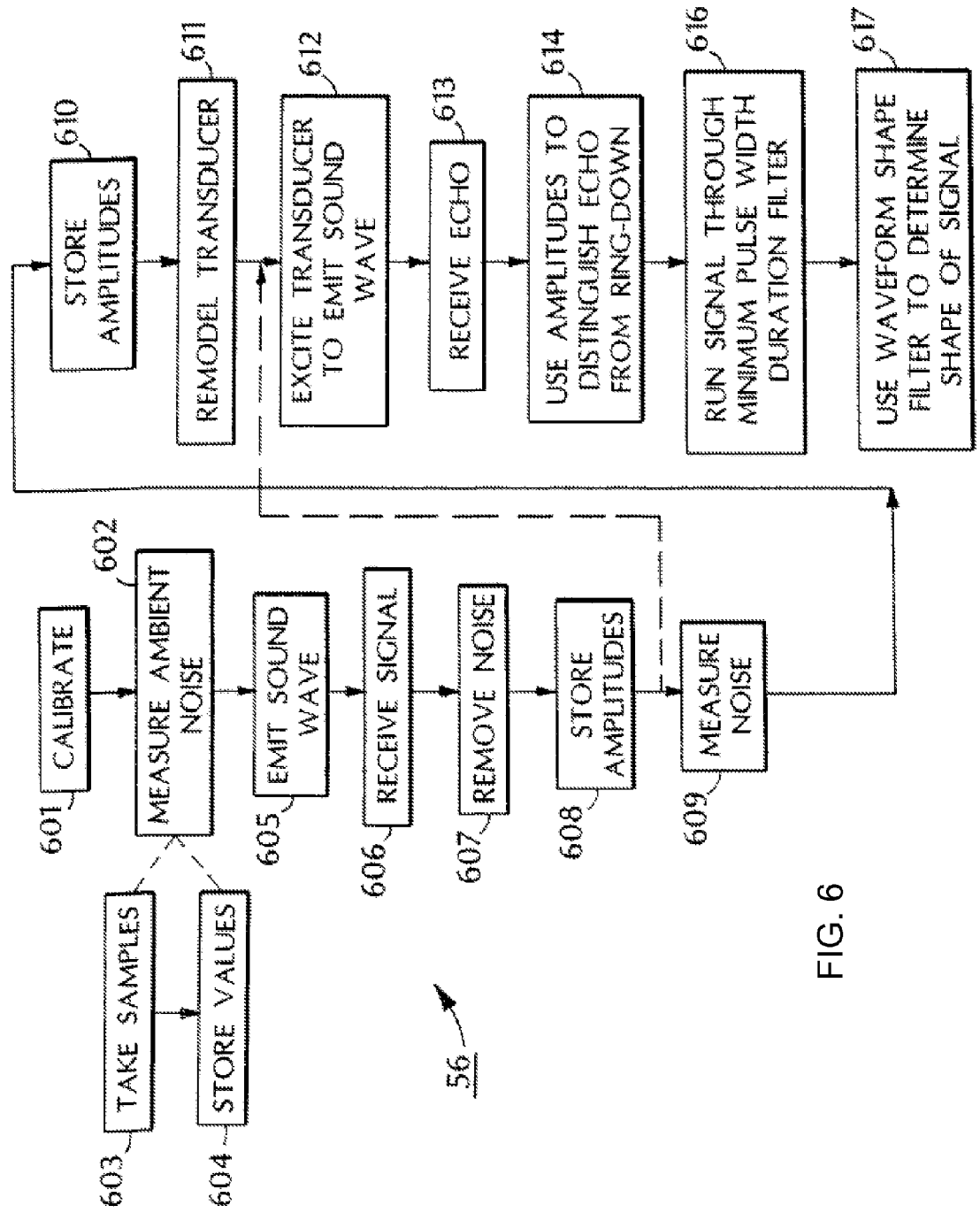
FIG. 6 is a flowchart showing a process performed by the sonar scanner for analyzing echoes.

Referring to FIG. 6, a dynamic threshold control process 56 is shown. Blocks 601 to 608 of FIG. 6 define the transducer modeling process and blocks 612 to 617 define the pulse-echo process. Process 56 includes a calibration phase, during which the processor determines the amount of ambient noise in the environment, i.e., the noise floor. The calibration phase can be performed at initial power-up of the scanner or it can be performed at any time from an idle mode by sending to the processor the appropriate commands via the host interface.

At calibration (601), the processor determines a zero degree reference point. The zero degree reference point is used by the device in determining where objects are located relative to the sensor. A Hall-Effect sensor (not shown), which is located on a PCB electronics board mounted on the robot, is used to determine the zero degree reference point. The Hall-Effect sensor acts as an absolute reference point. One of ordinary skill in the art will recognize that other sensors, such as an optical interrupter or a contact switch can be used instead.

The Hall-Effect sensor contains two elements: a sensor and a magnet. A motor rotates the magnet relative to the sensor. When the magnet crosses the sensor, a logic signal is generated, to indicate the zero degree reference point. A counter (not shown) receives the logic signal and begins counting to keep track of where the transducer is relative to the zero degree reference point. In this embodiment, calibration is performed twice; however, it may be performed any number of times.

Following position calibration, process 56 "models" transducer 12. What is meant by "model" in this context is that process 56 determines the ring-down characteristics of the transducer when it is excited, such as the amplitudes of sound waves produced by transducer 12. Process 56 uses this information to distinguish echoes from transducer ring-down, as described in more detail below.

During process 56 (modeling of transducer 12), the processor measures (602) the level of electrical and acoustic ambient noise in the robot's environment. Ambient environmental electrical and/or acoustic noise can affect the transducer's ability to detect the amplitude of an echo signal. For example, if amplitude thresholds are determined in the presence of a high level of ambient noise, the system may not accurately detect the amplitudes of echoes that are generated in environments having lower levels of ambient noise. In more detail, the ambient noise will increase the amplitudes of the echo, resulting in higher amplitude thresholds. Subsequent echoes measured in, e.g., less noisy environments may not be detected because their amplitudes will not reach the heightened thresholds. In measuring the level of ambient noise, process 56 takes (603) a number of samples (e.g., 64 samples) and stores (604) the maximum value of those samples.

Transmitter 14 excites transducer 12 with an impulse train. In response to the impulse train, transducer 12 vibrates, emitting (605) a sound wave. The sound wave includes a pulse signal 46 and a ring-down signal 48 (see, e.g., FIG. 3). Receiver 16 "listens" to the sound wave output by transducer 12. Receiver 16 receives (606) a sound wave, demodulates and digitizes the sound wave, and removes (e.g., subtracts) (607) the measured amount of ambient noise from the sound wave. Receiver 16 stores (608) amplitudes 55 (see FIG. 5) of the ring-down portion of the sound wave in an array of N (e.g., 16) memory elements, or "bins", within signal processor 18.

Process 56 then waits for a predetermined period of time following transmission of the sound wave. In this embodiment, the predetermined period of time is 50 ms (milliseconds); however, the invention is not limited to this time period. During this time period, the transmitted sound wave dissipates.

Process 56 repeats blocks 602 to 608 a number of times. In this embodiment, process 56 repeats blocks 602 to 608 sixteen times, although the blocks may be repeated any number of times. Each time blocks 602 to 608 are repeated, process 56 stores the amplitudes of the ring-down signal 48 (FIG. 5). Process 56 stores the largest amplitude of the ring-down signal and assigns these to be the amplitude thresholds. Alternatively, process 56 may process the amplitudes in order to assign the thresholds. For example, process 56 may average the amplitudes from corresponding cycles of different signals.

Process 56 uses the amplitude thresholds to distinguish between the ring-down signal and the echo. That is, the thresholds for the ring-down signal will generally be lower in amplitude than the echo. Comparing received signals to the amplitude thresholds thus determines which signals are ring-down signals (or extraneous noise) and which are echoes.

In one mode of operation, the acoustic reflector of sonar scanner 10 spins continuously throughout a 360° field of view while transmitting sound waves in the environment. In this mode, process 56 measures (609) the noise floor at the time of operation. Process 56 takes a number (e.g., 16) of samples of the receiver electrical and acoustic noise floor and stores (610) the peak amplitudes of the noise floor in memory.

Process 56 determines the angular velocity of the acoustic reflector assembly based on the maximum desired detection distance of the transducer. In this embodiment, the reflector does not move more than 8° in the amount of time that it takes for the transmitted sound wave to travel out a preset maximum detection distance to an object and back to the transducer. The acoustic reflector rotates at the determined velocity, which is controlled by a digital proportional-integral controller (not shown).

Process 56 remodels (611) transducer 12 using data obtained in blocks 609 and 610 every 368°, although remodeling may take place at other angles. For cycles in which remodeling does not take place, process 56 skips from block 608 directly to block 612. Normal data collection is suspended during remodeling. Remodeling takes place to adapt to changes in the transducer ring-down profile due to changing environmental conditions (e.g., temperature) and transducer degradation (e.g., material fatigue).

Process 56 uses the measurement of the ambient noise at the time that the transducer is remodeled to determine the threshold used in the above comparison. That is, process 56 combines (e.g., adds) the ambient noise measured at the time the transducer is remodeled with the stored amplitude values. This way, the amplitudes are adapted to the noise environment in which the echo occurs, hence the term "adaptive threshold". That is, the thresholds set by the amplitudes are modified take into account the ambient noise in the current environment of the echo.

Process 56 excites (612) transducer 12 with a waveform from transmitter 14 to transmit a sound wave. The fundamental frequency of the waveform and its pulse shape are programmable, thus making it possible to shape the waveform. Process 56 stores the angle of the acoustic reflector at the time the transducer is excited. This information is used to position objects relative to the robot in the environment.

In process 56, receiver 16 receives (613) an echo of the transmitted sound wave. Process 56 uses (614) the stored amplitudes from the ring-down portion of the sound wave to distinguish the ring-down portion from the echo. In this embodiment, process 56 collects data for three echoes from each transmitted sound wave, although the invention is not limited as such (i.e., data for more or less echoes may be collected, as desired). The data stored for each echo includes the time of flight, the peak amplitude of the demodulated echo, the duration of the echo, and the angle of the acoustic reflector at the time that the echo is received.

As data for each signal is received, process 56 runs the data through three software filters executing in signal processor 18 to determine if the signals are "valid" echoes from an object within the field of view of the transducer or the result of electrical and/or acoustic noise, such as the ring-down signal.

The filters include a dynamic threshold filter. The dynamic threshold filter analyzes the received signal in order to distinguish a valid echo of the pulse signal from the ring-down signal of the original sound wave or extraneous noise. Process 56 detects amplitudes of the signal based on the thresholds stored in memory.

In more detail, process 56 compares the amplitude of the received signal to a corresponding threshold from memory (e.g., 55 from FIG. 5). If the amplitude of the received signal exceeds the threshold, then the received signal is determined to be the echo of the pulse signal (see, e.g., echo 54 of FIG. 5). The dynamic threshold filter compares the ring-down signal of the transmitted sound wave to the combined amplitude and ambient noise values. The combined amplitude and ambient noise comprise the echo threshold for the current environment. That is, a signal at that level or above is determined to be an echo of the transmitted pulse signal of the sound wave. A signal below that level is determined to be a ring-down signal of the sound wave, or noise. In case an echo is detected, a pulse (FIG. 7) is transmitted to signal processor 18. Thus, the dynamic threshold filter is able to distinguish ring-down signals from echoes without regard to ambient noise. It is noted that the thresholds will be at least as high as the measured ambient noise, since the ambient noise is added to the amplitude values.

Impulse Noise

Process 56 also runs (616) the received signal through a minimum pulse width duration filter. The minimum pulse width duration filter measures the width of the signal to determine if it has greater than a predetermined duration.

In this regard, impulse noise, i.e., short duration, high amplitude noise, can adversely affect echo detection. The minimum pulse width duration filter therefore discounts impulse noise during echo detection. The minimum pulse width duration filter measures a duration of the detected echo and determines if the duration exceeds a predetermined period. The predetermined period may be obtained experimentally and stored in memory, or it may simply be assigned and stored. The predetermined period may be a fraction of the period of the transmitted signal. For example, it may be one-tenth of the period of the transmitted signal, or any other fraction thereof.

If the duration of the signal exceeds the predetermined period (and exceeds the appropriate amplitude threshold as described above), the minimum pulse width duration filter decides that the received signal is an echo of the pulse signal. If the duration of the signal does not exceed the predetermined period, the minimum pulse width duration filter decides that the signal is impulse noise. Impulse noise is simply ignored, whereas the echo may be used to determine information relating to an object, such as the distance to the object, as described above.

Waveform Shaping

Process 56 uses a waveform filter (617) to determine the shape of the echo. In this embodiment, the shape of the echo should match the shape of the transmitted pulse to within some preset tolerance. In process 56, transducer 12 transmits a sound wave that has been shaped, i.e., a waveform having a predetermined shape. The shape of the waveform is determined based on electrical signals from transducer 12. Changing these signals changes the shape of the waveform.

Transducer 12 receives a signal following the transmission. The shape filter analyzes the signal in order to determine if the signal is an echo of the transmitted sound wave. The shape filter performs the analysis by obtaining the shape of the received signal and comparing the shape of the received signal to the pre-stored shape of the transmitted sound wave. If the shapes are within a pre-set tolerance of one another, e.g., if they match by 90% or some other number, then the received signal is determined to be the echo of the transmitted sound wave. Otherwise, the received signal is determined not to be an echo.

If the dynamic threshold control filter, the minimum pulse width duration filter, and the waveform filter all indicate that the received signal is an echo, process 56 determines that the signal is an echo. In this case, the received signal may be used to determine the distance to an object or any other information relating thereto that can be ascertained based on the echo. If the received signal is not an echo, it is merely ignored.

It is noted that process 56 may be performed without using one or more of the dynamic threshold control filter, the minimum pulse width duration filter, and/or the waveform filter. Also, additional filters (not shown herein) may be added, as desired.

Modes of Operation

The velocity mode of operation, in which transducer 12 rotates, is described above. Other modes of operation also may be used. In the "position" mode of operation, process 56 rotates acoustic reflector 38 to a commanded position, where transducer 12 is continuously excited. For example, acoustic reflector 38 may be rotated to a position to focus on a particular object. At that position, data may be collected for the object. The remainder of the position mode is identical to that described above.

Process 56 may also operate in a "fire" mode. In the fire mode, the transducer emits a single sound wave and collects data from up to three echoes of that sound wave in the manner described above in the current position.

Multiple Object Detection and Validation

Figure 8:
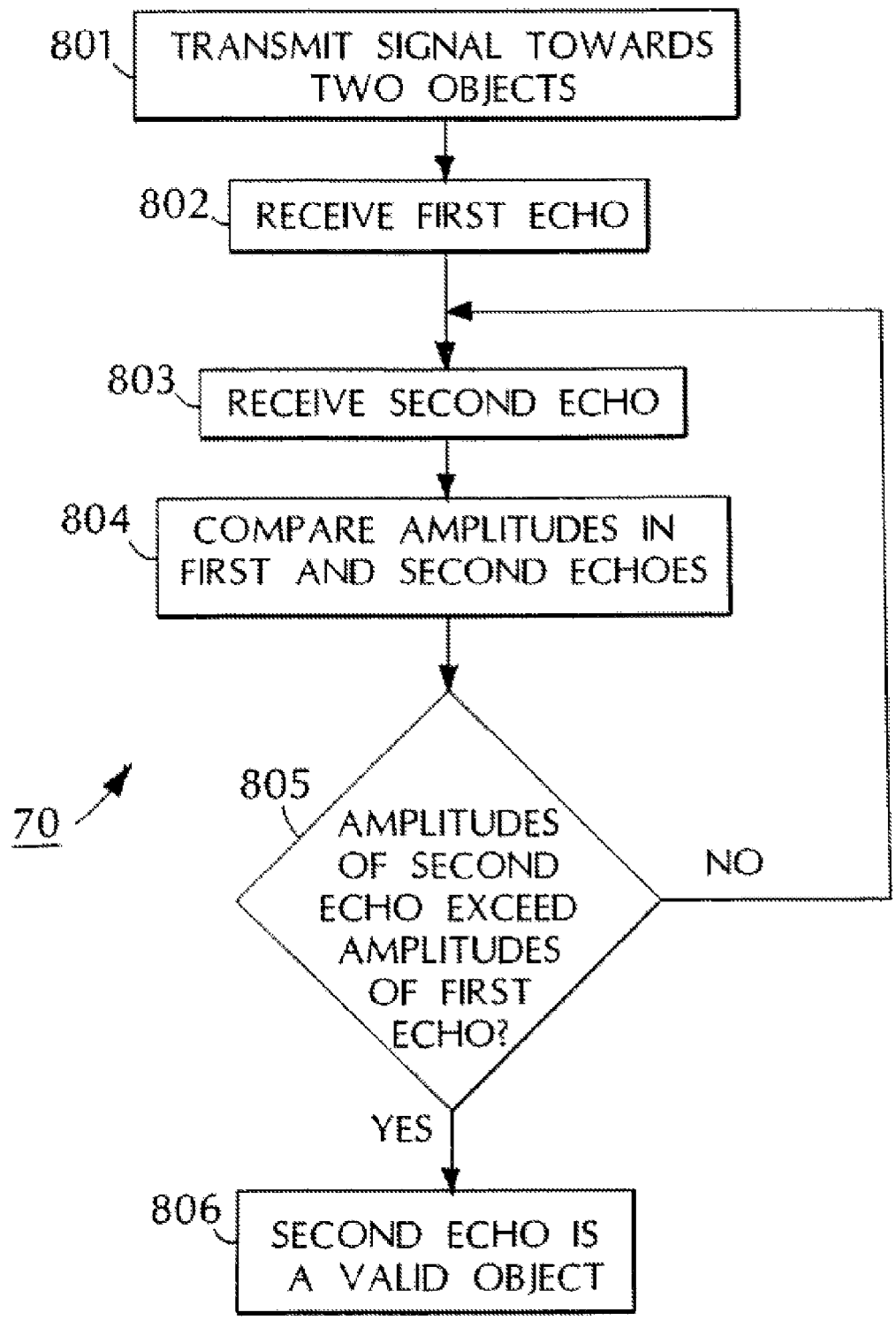
FIG. 8 is a flowchart showing a process performed by the sonar scanner for obtaining information from echoes produced by objects that are one in front of the other.

Process 56 may store information relating to multiple echoes from the same object, as described above. Process 70 (FIG. 8), on the other hand, is used to determine information relating to objects that are positioned one in front of the other. In particular, process 70 detects echoes of objects in which an acoustically-weaker object is in front of an acoustically-stronger object.

In this context, an acoustically-weak object is an object that does not reflect sound waves well. For example, small and/or narrow objects, such as a lamppost, may not reflect sound waves as well as large flat objects, such as a wall. Likewise, the texture of an object may affect the object's ability to reflect sound waves. For example, hard, smooth objects will reflect sound waves better than soft or rough object.

Process 70 detects multiple (e.g., three) echoes in cases where an acoustically-weak object is positioned in front of an acoustically-stronger object relative to transducer 12. Process 70 does this by detecting echoes from the two objects that have increasing amplitudes. In this regard, although process 70 is described for the case of two objects, it may be used for any number of objects. Process 70 may also detect any number of echoes.

Figure 9:
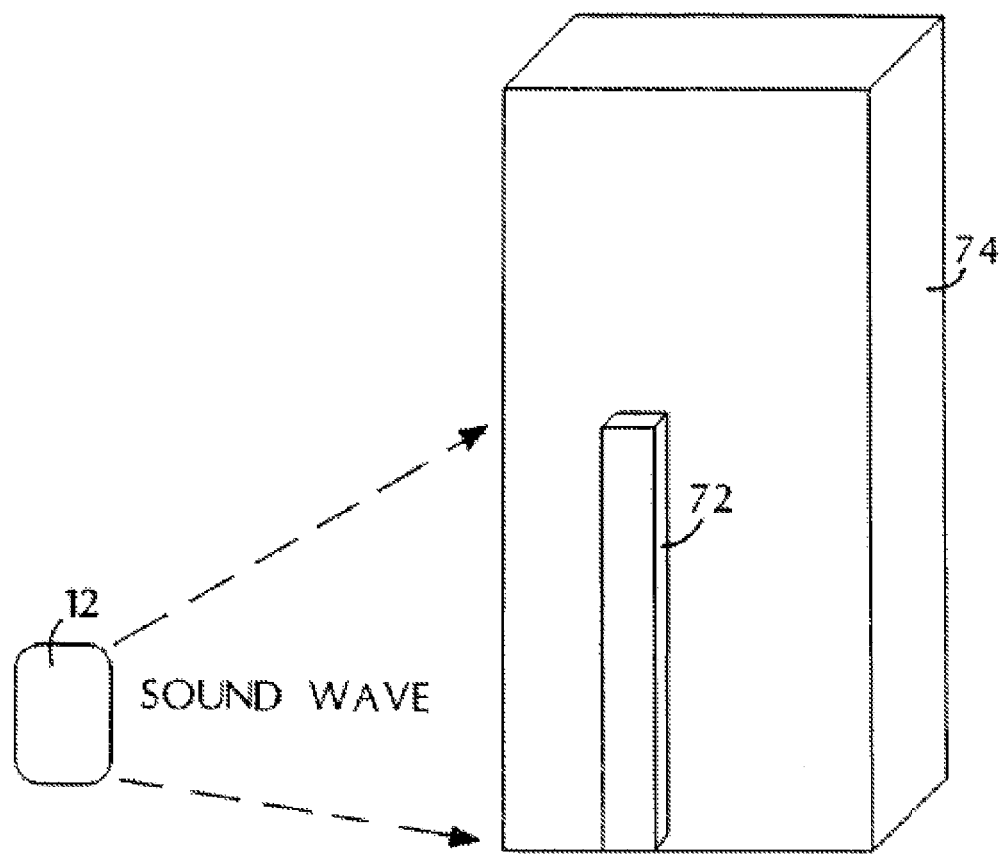
FIG. 9 is a perspective view of two objects that are positioned one in front of the other.

In process 70, transducer 12 transmits (801) a sound wave towards the two objects, such as objects 72 and 74 shown in FIG. 9. The sound wave may be a signal, such as that shown in FIG. 3. Transducer 12 receives (802) a first echo from the objects and then receives (803) a second echo from the objects. Process 70 detects amplitudes in the first and second echoes and compares (804) the amplitudes in corresponding cycles of the echoes.

If the amplitudes of the second echo exceed the amplitudes of the first echo in corresponding cycles, this means that the object that reflected the second echo is acoustically-stronger than the object that reflected the first echo. If the amplitudes of the second echo exceed the amplitudes of the first echo (805), process 70 determines (806) that the second object is a valid object and not a multipath reflection (since process 70 assumes that a weaker signal behind a smaller signal is a multipath error). The two objects may then be analyzed, as described above. For example, process 70 may analyze its echoes to determine the distances to each of the objects from transducer 12. Process 70 may also store the information that it learns from the echoes in memory for later use. If the amplitudes of the second echo do not exceed the amplitudes of the first echo (805), process 70 returns to block 803, whereafter blocks 803 to 805 are repeated.

Process 70 may be performed alone or in conjunction with process 56 described above.

Threshold Control Using Multiple Echoes

As described above, reflector 38 does not move more than 8° in the amount of time that it takes for a transmitted sound wave to travel out a preset maximum detection distance to an object, and for its reflection (echo) to travel back to transducer 12. At each 8° rotation, transducer 12 outputs a new sound wave and subsequently detects an echo of the new sound wave.

Problems may arise if transducer 12 receives an echo from a previous 8° rotation. By way of example, assume that transducer 12 emits an initial sound wave during a first 8° rotation. Transducer 12 receives echoes of the initial sound wave from objects within the preset maximum detection distance before transducer 12 enters a second 8° rotation. Echoes from objects outside the preset maximum detection distance may not received within the time frame allotted by transducer 12 for receipt of echoes from the initial sound wave. However, echoes from these objects may be received during a next, or "second", 8° rotation. If such echoes are received during the second 8° rotation, the echoes are misinterpreted as echoes of sound wave(s) emitted during the second 8° rotation (even though the echoes are actually echoes resulting from the first sound wave emitted during the first 8° rotation).

Processor 18 uses echoes received from emitted sound waves to identify objects, as described above. Echoes of previously emitted sound waves, such as those from "long-range" objects noted above, can lead to improper identification of objects. For example, transducer 12 may emit a sound wave and then almost immediately receive an echo of a previous sound wave reflecting off of a long-range object. Heretofore, processor 18 could erroneously interpret this newly-received echo to mean that an object is located in close proximity to the transducer.

Figure 10:
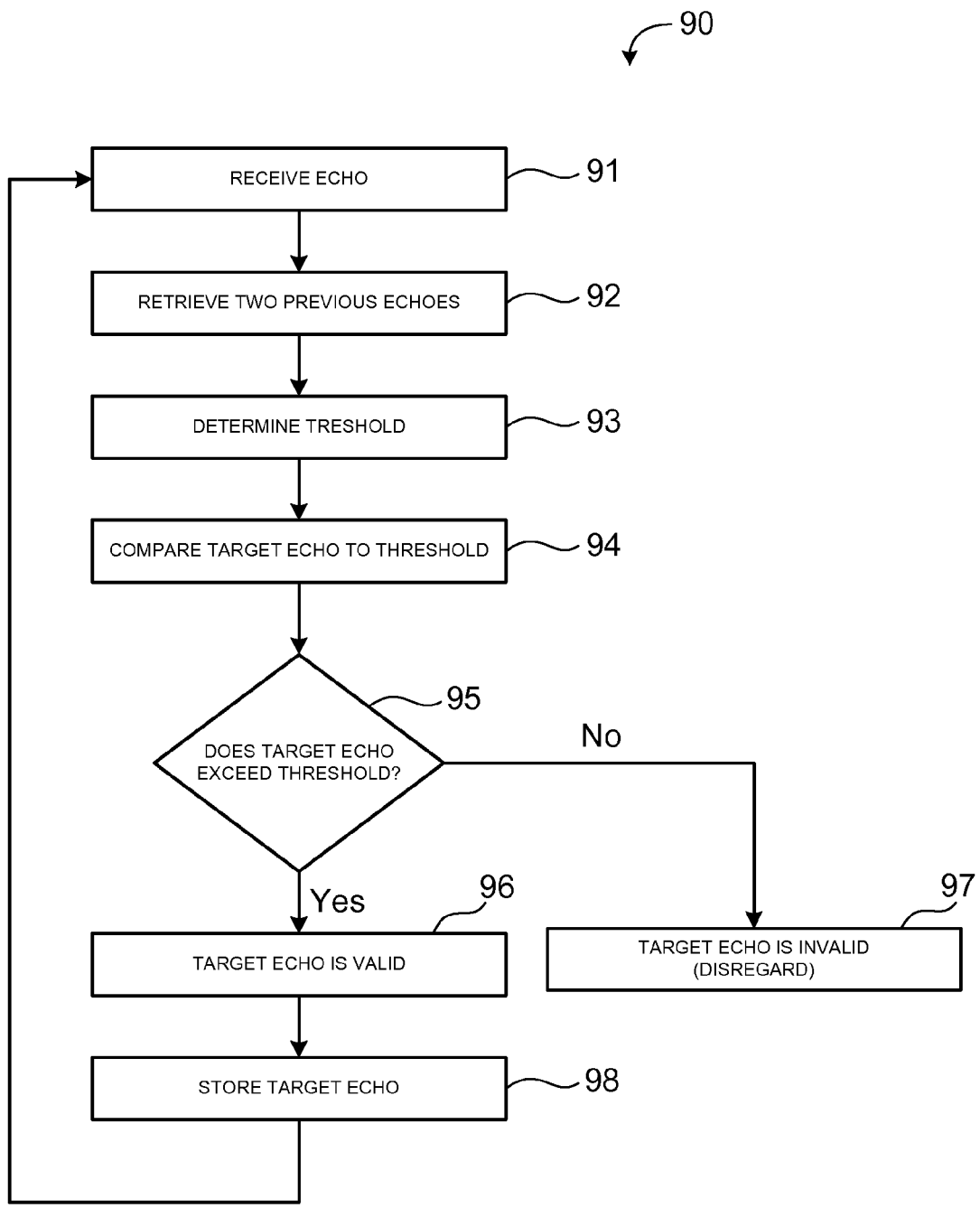
FIG. 10 is a flowchart showing a process performed by the sonar scanner for disregarding echoes from "long-range" objects during object detection.

To address the foregoing problem, sonar scanner 10 may perform process 90 (FIG. 10). Process 90 takes adjacent echoes into account when determining whether an echo is from a current sound wave or from an earlier sound wave "bouncing" off of a long-range object. Nearby objects tend to produce adjacent echoes of similar magnitude, whereas long-range objects tend to produce single echoes of a relatively lower magnitude (due to their distance from the transducer). Taking into account the magnitudes of adjacent echoes may reduce erroneous object detection resulting from echoes off of long-range objects.

In process 90, transducer 12 vibrates to emit sound waves in the manner described above. Transducer 12 receives (91) an echo of a sound wave. The received echo is processed and digitized by circuitry described above and the resulting "digitized echo" is provided to processor 18.

Processor 18 retrieves (92), from memory, two previously-received digitized echoes. Processor 18 uses these digitized echoes, together with the current digitized echo, to determine (93) a threshold value (referred to herein simply as a "threshold"). The digitized echoes processed in this embodiment are adjacent in a temporal sense, meaning that they correspond to actual echoes that were received one after the other in time prior to the current echo. Other embodiments, however, may not use temporally adjacent echoes to determine the threshold. For example, every other echo may be used to determine the threshold. Alternatively, only echoes that have a specific characteristic, such as a minimum magnitude, may be used.

Processor 18 determines (93) the threshold using the current digitized echo and the two digitized echoes retrieved from memory. In alternative embodiments, the threshold may be determined using more, or less, than the two most recently preceding echoes. Processor 18 determines the threshold by averaging magnitudes of the current digitized echo and the two most recently preceding digitized echoes. A scaling factor may be applied to the resulting product, if necessary. The scaling factor may be used to adjust the threshold to permit detection of more or less echoes. The scaling factor may be added to, multiplied to, or subtracted from the product.

Processor 18 selects a digitized echo from among the ones that were averaged. The selected echo is referred to herein as the "target echo". The target echo is the echo that is being analyzed by process 90 to determine if it is valid or invalid. In this context, a "valid" echo is an echo of a sound wave that is received during the same 8° rotation that the sound wave is emitted. An "invalid" echo is an echo that is not received during the same 8° rotation as its corresponding sound wave. Invalid echoes include echoes of sound waves emitted during previous 8° rotations and other spurious echoes received by transducer 12.

In this embodiment, the target echo is the echo that is immediately prior to the current echo in time. Thus, of the three digitized echoes under consideration (i.e., the current digitized echo and the two retrieved from memory), the target echo corresponds to the digitized echo that is in the "middle" of the three. In other embodiments, a different echo may be selected as the target echo.

Processor 18 compares (94) the digitized target echo to the threshold determined in block 93. If the digitized target echo exceeds the threshold, processor 18 deems (96) the target echo to be a valid echo. Otherwise, processor 18 deems (97) the echo to be an invalid echo. If the echo is a valid echo, processor 18 detects an object using the echo in the manner described above. If the echo is an invalid echo, processor 18 disregards the echo, meaning that the echo is not used to detect an object.

Valid echoes are stored (98) in memory and used in subsequent threshold determinations. That is, process 90 is repeated for each 8° rotation, as shown in FIG. 10. Each time a new echo is received, the new echo becomes one of the three echoes used to determine the threshold. The earliest of the previous three echoes is disregarded.

It is noted that process 90 is not limited to use with sound waves emitted during 8° rotations of the transducer. Process 90 may be implemented with sound waves emitted, and echoes detected, at any frequency.

Process 90 is also not limited to use with sound waves and echoes. Process 90 may be used with any type of emission and reflection. For example, process 90 may be used in a laser-based object detection system, in which laser beams constitute the emissions (analogous to the sound waves above) and in which reflections of the laser beams are received (analogous to the echoes above). Representative computer code for implementing a laser-based system is included in the attached Appendix.

Process 90 may be used alone or in combination with processes 56 and 70 and the filters described above.

Architecture

Processes 56, 70 and 90 are not limited to use with the hardware/software configuration of FIGS. 1 and 2; they may find applicability in any computing or processing environment. To the extent practicable, processes 56, 70 and 90 may be implemented in hardware (e.g., an ASIC {Application-Specific Integrated Circuit} and/or an FPGA {Field Programmable Gate Array}), software, or a combination of hardware and software.

Processes 56, 70 and 90 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 56, 70 and 90.

Processes 56, 70 and 90 may also be implemented using a computer-readable storage medium, configured with a computer program, where, upon execution, instructions in the computer program cause the computer to operate in accordance with processes 56, 70 and 90.

Processes 56, 70 and 90 may be used together or alone. Processes 56, 70 and 90 may be used in conjunction with a mobile robot, as described herein, or outside the context of robotics. Processes 56, 70 and 90 may be used to determine information other than that described above (i.e., distance). For example, processes 56, 70 and 90 may be used to determine the shape of an object, the texture of an object, or any other information that can be obtained based on acoustic echoes from an object.

Other embodiments not described herein are also within the scope of the following claims.

APPENDIX

```
// For each point, filter the range to require that for returns
// within 2 meters that a neighboring scan must also see a signature
// within 10 cm. This will filter out snow and other singleton
// returns.
    int rawRangeFilterLimit = (int)((2.0 − sickd__config.offset)
                    / sickd__config.scale__factor);
    double maxDiffMeters = 0.1;
    int maxDiff = (int)(maxDiffMeters / sickd__config.scale__factor);
    for (int k = 1; k < num__values − 1; ++k) {
        int rawRange = sick__scan.range[k];
        if (rawRange < rawRangeFilterLimit) {
            // The following is a test of a percentage style diff.
            // maxDiff = rawRange / 20; if (maxDiff < 3) maxDiff = 3;
            int back__diff = abs(sick__scan.range[k − 1] − rawRange);
            int forward__diff = abs(sick__scan.range[k + 1] −
            rawRange);
            if (back__diff > maxDiff && forward__diff > maxDiff) {
```

APPENDIX-continued

```
                sick__scan.range[k] = (unsigned
                short)RANGE__MASK;
            } else if (rawRange < 10) {
                sick__scan.range[k] = (unsigned
                short)RANGE__MASK;
            }
        }
    }
```

What is claimed is:

1. A mobile robot control system, the system comprising:
    a generator configured to generate multiple, sequential emissions;
    a transducer in communication with the generator configured to transmit emissions of the generator and to receive reflections of transmitted emissions;
    a conditioner in communication with the transducer to condition received reflections; and
    a processor in communication with the conditioner configured to:
        obtain a threshold value based on a latest one of the reflections and previously received ones of the reflections determined to fall within a predetermined range of the latest reflection,
        determine if the latest reflection is a result of a latest one of the outputted emissions based on the threshold value, and
        control the mobile robot based on the determination of whether the latest reflection is a result of the latest outputted emission.

2. The system of claim 1, further comprising a reflector coupled to the transducer to direct transmitted emissions away from the transducer and to direct reflections toward the transducer.

3. The system of claim 2, wherein the reflector comprises a reflective surface facing the transducer.

4. The system of claim 3, wherein the reflective surface is contoured such that the transmitted emissions are directed away from the transducer in a limited reflection field.

5. The system of claim 3, wherein the reflective surface is shaped and positioned such that the transducer is responsive to reflections at a ±5 degree angle from a center-line of the reflective surface.

6. The system of claim 3, wherein the reflective surface comprises an acoustic mirror.

7. The system of claim 2, wherein the reflector is configured to direct transmitted emissions away from the transducer in a selected reflection field.

8. The system of claim 7, wherein the reflector is positioned at an angle with respect to the transducer.

9. The system of claim 7, further comprising a cone-shaped housing in which the reflector is disposed.

10. The system of claim 7, wherein the reflector is movable with respect to the transducer.

11. The system of claim 7, further comprising a controller for controlling the position of the reflector.

12. The system of claim 1, wherein the conditioner comprises an amplifier.

13. The system of claim 1, wherein the conditioner comprises a filter.

14. The system of claim 1, wherein the transducer is rotatable through 360 degrees.

15. The system of claim 1, further comprising a controller for controlling an angular position of the transducer.

16. The system of claim 1, wherein the transducer is an acoustic transducer responsive to electrical signals received from the generator.

17. The system of claim 1, wherein the generator and transducer are configured to generate and transmit emissions comprising waveforms.

18. The system of claim 17, wherein the generator and transducer are configured to generate and transmit emissions comprising sound waves.

19. The system of claim 1, wherein the generator and transducer are configured to generate and transmit emissions comprising laser beams.

20. The system of claim 1, wherein the generator is in communication with the processor and configured to produce electrical signals based on output from the processor.

21. The system of claim 20, wherein the generator is further configured to provide the electrical signals to the transducer.

22. A method of controlling a mobile robot, the method comprising:
    outputting multiple, sequential emissions from a scanner;
    receiving reflections of the outputted emissions with the scanner;
    obtaining a threshold value based on a latest one of the reflections and previously received ones of the reflections determined to fall within a predetermined range of the latest reflection;
    determining if the latest reflection is a result of a latest one of the outputted emissions based on the threshold value; and
    controlling the mobile robot based on the determination of whether the latest reflection is a result of the latest outputted emissions,
    wherein the scanner comprises:
        an emission generator;
        a transducer in communication with the generator to transmit generated emissions and to receive emission reflections; and
        a conditioner in communication with the transducer and configured to condition received reflections.

23. A method of controlling a mobile robot, the method comprising:
    receiving plural reflections of corresponding emissions with a scanner;
    determining a threshold value based on a target reflection and received reflections determined to each result from a corresponding emission;
    determining if the target reflection is a reflection of a latest emission; and
    controlling the mobile robot based on the determination of whether the target reflection is a reflection of the latest emission,
    wherein the scanner comprises:
        an emission generator;
        a transducer in communication with the generator to transmit generated emissions and to receive emission reflections; and
        a conditioner in communication with the transducer and configured to condition received reflections.

24. The method of claim 23, further comprising comparing the target reflection to the threshold value, the target reflection comprising one of the plural reflections.

25. The method of claim 24, wherein determining if the target reflection is a reflection of a latest emission is based on the comparison to the threshold value.

* * * * *

UNITED STATES PATENT AND TRADEMARK OFFICE
CERTIFICATE OF CORRECTION

PATENT NO. : 8,295,125 B2
APPLICATION NO. : 13/350447
DATED : October 23, 2012
INVENTOR(S) : Mark J. Chiappetta and James Allard It is certified that error appears in the above-identified patent and that said Letters Patent is hereby corrected as shown below:

Column 1, Line 8, delete "2010," and insert -- 2010 --, therefor.

Column 1, Line 9, delete "8,107,318)" and insert -- 8,107,318), --, therefor.

Column 1, Line 24, delete "2001 issued" and insert -- 2001 (issued --, therefor.

Column 1, Line 24, delete "6,662,889),and" and insert -- 6,662,889), and --, therefor.

Signed and Sealed this
Twenty-sixth Day of February, 2013

Teresa Stanek Rea
*Acting Director of the United States Patent and Trademark Office*